(12) United States Patent
Allen (10) Patent No.: US 8,086,223 B2
(45) Date of Patent: Dec. 27, 2011

(54) USING PROXIMITY INFORMATION TO DYNAMICALLY CHANGE GREETING MESSAGES ON A MOBILE TELEPHONY DEVICE

(75) Inventor: Joel B. Allen, Mebane, NC (US)

(73) Assignee: International Business Machines Corporation, Armonk, NY (US)

( * ) Notice: Subject to any disclaimer, the term of this patent is extended or adjusted under 35 U.S.C. 154(b) by 1124 days.

(21) Appl. No.: 11/851,562

(22) Filed: Sep. 7, 2007

(65) Prior Publication Data

US 2009/0068993 A1 Mar. 12, 2009

(51) Int. Cl.
*H04M 11/10* (2006.01)
*H04L 12/58* (2006.01)
*H04M 1/725* (2006.01)

(52) U.S. Cl. .................................. 455/413; 455/412.1

(58) Field of Classification Search .............. 455/412.1, 455/413

See application file for complete search history.

(56) References Cited

U.S. PATENT DOCUMENTS

| | | | | |
|---|---|---|---|---|
| 5,995,830 A * | 11/1999 | Amin et al. | ............... | 455/423 |
| 7,612,680 B2 * | 11/2009 | Eubank et al. | .............. | 340/573.1 |
| 7,675,411 B1 * | 3/2010 | Michaelis et al. | ....... | 340/539.12 |
| 7,702,340 B2 * | 4/2010 | Pournasseh et al. | ........... | 455/466 |
| 2003/0092451 A1 | 5/2003 | Holloway et al. | | |
| 2003/0225832 A1 * | 12/2003 | Ludwig | .......................... | 709/204 |
| 2005/0089149 A1 | 4/2005 | Elias | | |
| 2005/0201362 A1 * | 9/2005 | Klein et al. | ..................... | 370/352 |
| 2006/0178134 A1 * | 8/2006 | Adams et al. | ................. | 455/413 |
| 2006/0239419 A1 | 10/2006 | Joseph et al. | | |
| 2008/0153459 A1 * | 6/2008 | Kansal et al. | .............. | 455/412.1 |

OTHER PUBLICATIONS

Personal area network, Wikipedia, 2 pages.*

* cited by examiner

*Primary Examiner* — Nick Corsaro
*Assistant Examiner* — Munsoon Choo
(74) *Attorney, Agent, or Firm* — Patents on Demand, P.A.; Brain K. Buchheit; Scott M. Garrett (57) ABSTRACT

The present invention discloses a solution for delivering customized greeting messages to callers. In the solution, a call can be received from a remote device. A greeting message that is to be conveyed to the remote device due to a failure of a receiving party to answer the call can be determined. A set of devices proximate to a call receiving device can be identified. One of many different greeting messages can be determined based upon the identified set of proximate devices. The determined greeting message can be conveyed to the remote device.

17 Claims, 4 Drawing Sheets

USING PROXIMITY INFORMATION TO DYNAMICALLY CHANGE GREETING MESSAGES ON A MOBILE TELEPHONY DEVICE

BACKGROUND

1. Field of the Invention

The present invention relates to greeting (e.g., voicemail) message customization, and more particularly, to using proximity information to dynamically change greeting messages on a mobile telephone device.

2. Description of the Related Art

Currently, a large portion of the population in many countries own mobile telephony devices. Over recent years, the adoption of mobile telephony devices has risen dramatically. In some countries like Japan, it's become a part of the culture. Part of this culture relates to expressing one's personality through device configurable settings. There are many settings on mobile telephony devices that are commonly personalized, such as a greeting message, such as the greeting message. A greeting message is a message heard by a caller when the callee fails to answer. The greeting message often precedes an option for a caller to leave a voice message.

In some cases, it would be beneficial to use variable greeting messages that change based upon an environmental condition. For example, if a student was in class, they may prefer to have a greeting message state that they're currently in class until a stated time and will respond soon after class completes. If that student was in another place, a different greeting message may be preferred.

SUMMARY OF THE INVENTION

The disclosed invention describes a solution for using proximity information to dynamically change greeting messages on a mobile telephony device. Proximity information can include information about devices in the surrounding area. By determining which devices are located in the surrounding area, location can be determined and greeting messages can be changed dynamically based on the mobile telephony device's location.

In one example, an office worker when at home will be located close to devices located in his home. The worker's mobile telephony device can detect these proximate home devices and can use dynamically change a phone greeting message to a home-specific greeting. When the office worker enters their office, the mobile telephony device can detect proximate office devices and can use this information to dynamically change a phone greeting message to an office-specific greeting.

In one embodiment, processes for customized greeting messages can be offloaded to proximate devices. Not only does offloading processes to proximate devices conserve resources of the resource constrained mobile device, but it also permits custom content available only to the proximate devices to be included in a greeting message. For example, an office computer can be used to maintain a user's schedule. When a mobile device is proximate to this office computer, entries from this schedule can be used when generating greeting messages. For instance, a schedule-aware greeting message can state "The user is in a meeting for the next hour where phone access is restricted, if this is an emergency call number 555-5555 to interrupt the meeting. Otherwise, the user will return your call within the next two hours."

The present invention can be implemented in accordance with numerous aspects consistent with the material presented herein. For example, one aspect of the present invention can include a method for delivering customized greeting messages to callers. The method can include a step of receiving a call from a remote device. A greeting message that is to be conveyed to the remote device due to a failure of a receiving party to answer the call can be determined. A set of devices proximate to a call receiving device can be identified. One of many different greeting messages can be determined based upon the identified set of proximate devices. The determined greeting message can be conveyed to the remote device.

Another aspect of the present invention can include a mobile communication device that includes a message handling engine configured to provide different greeting messages to callers selected based upon devices proximate to the mobile communication device.

Still another aspect of the present invention can include software for delivering different greeting messages depending on devices proximate to a call receiving device. The software can include a set of programmatic instructions configured to direct a mobile communication device to provide different greeting messages to callers based upon which devices are proximate to the mobile communication device. Each of the greeting messages can be messages able to be conveyed to remote device whenever incoming calls are not answered. The set of programmatic instructions can be stored in a data store accessible by the mobile communication device and can be executable by the mobile communication device.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
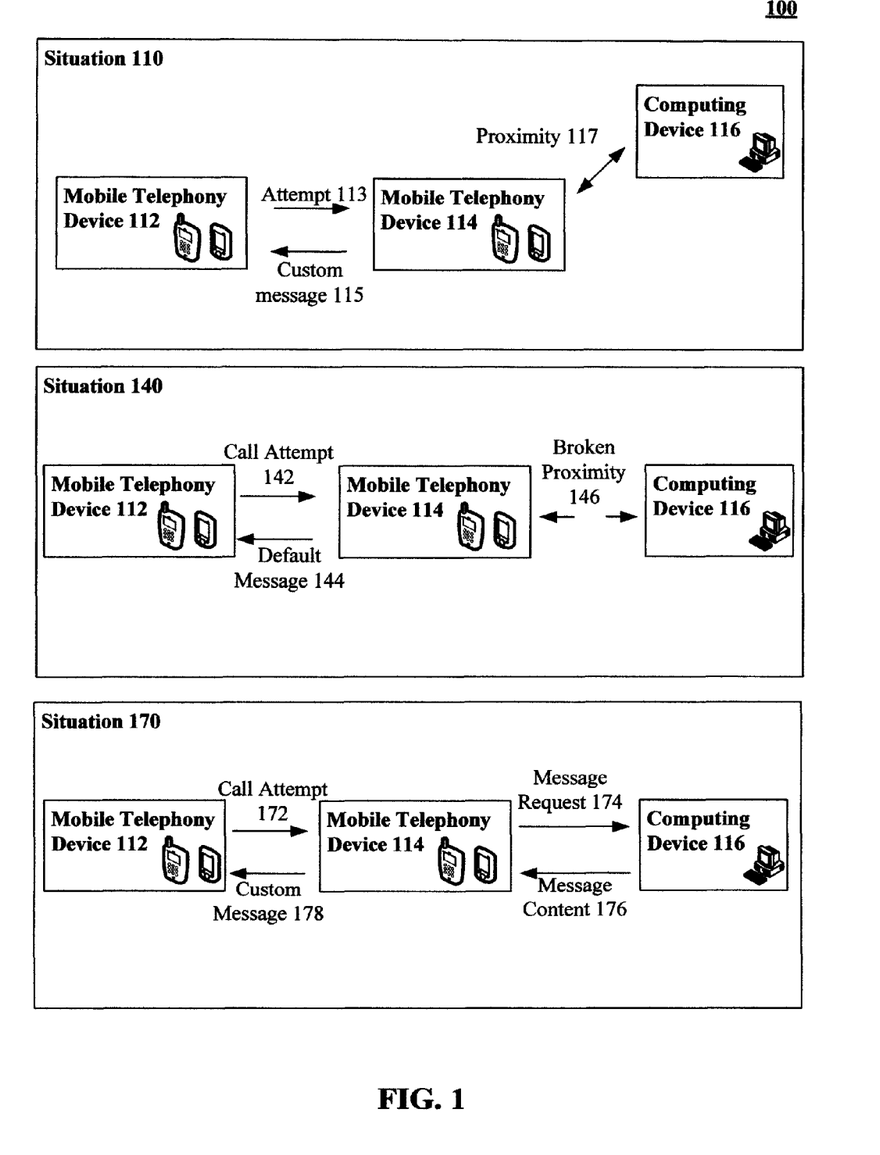
FIG. 1 is a schematic diagram of a system for using proximity information to dynamically change greeting messages provided by a mobile telephony device to a calling device based upon a proximity of a device to nearby devices.

FIG. 1 is a schematic diagram of a system 100 for using proximity information to dynamically change greeting messages provided by a mobile telephony device 114 to a calling device 112 based upon a proximity of device 114 to nearby devices 116. System 100 illustrates numerous situations 110, 140, 170 and details mobile device 114 behavior in each. The behavior of device 114 is specific to a manner is which greeting messages are generated based upon situational factors.

Situation 110 illustrates a mobile telephony device 114 that internally processes greeting messages, which can vary based upon a proximity 117 of the device 114 and other devices. In situation 110, mobile device 114 is proximate to device 116, which results in custom message 115 being delivered to device 112 responsive to a communication attempt 113 which was not answered. It should be appreciated that a different greeting message 115 would be provided if the device 114 was not proximate to computing device 116, as shown in situation 140. That is, situation 140 demonstrates a scenario where mobile device 114 is outside a designated proximity 146 range of computing device 116. When a call attempted 142 from device 112 is not answered by a user of device 114, a default greeting message 144 can result.

Processing for a greeting message can be performed at least in part by a remotely located computing device 116, which is shown in situation 170. When a call attempt 172 is conveyed from calling device 112 to the called device 114, a message request 174 to be sent from called device 114 to proximate device 116. The message request 174 can include attempt 172 specific details, which may be a factor considered in generating customized message content 176. When device 114 is to present a greeting message to calling device 112, the device 116 produced message content 176 can be included in the custom message 178. Situation 170 can beneficially offload responsibilities of greeting message handling from a resource constrained device 114 to a proximate device, which when device 116 is a personal computer is most likely more resource rich than mobile device 114. The proximate computing device 116 can also have access to information not available to device 114, which can be included in message content 176.

As shown in system 100, the device 112 and device 114 can communicate over a telephony network and messages 115, 144, 178 sent to device 112 can be voice messages. Different types of communications, such as text messaging, can also occur between devices 112 and 114 and the greeting message 115, 144, and 178 can be formatted appropriately for the type of communication.

Further, in one embodiment (situation 170), text interactions can be dynamically converted to audio, which is included in a custom message. For example, a mobile device 114 user can be utilizing an instant messaging (IM) client of device 116, when a call attempt 172 is made. A message of the attempt 172 can be presented within the IM interface, which permits the user to input a text message. This input message can be conveyed to a text-to-speech conversion program and converted to audio, which is included in the custom message 178.

Additionally, the mobile telephony device 114 can detect proximate devices 116 using various technologies. For example, the device 114 can include a wireless personal area network (PAN) (e.g., BLUETOOTH, WiFi, Wireless USB, etc.) transceiver able to connect to device 116 when in PAN range. Content 174, 176 exchanged between devices 114 and 116 can be conveyed over the PAN. Proximate device 116 can optionally include a settings that causes the mobile telephony device 114 to ignore the device 116, so that device 116 is considered outside a proximity range (situation 140) even when it is proximate to device 114 (situation 120)

In another embodiment, a location beacon can be included in device 114 that is able to ascertain relative positions of the devices 114 and 116. For example, Radio Frequency Identification (RFID) scanner attached to device 114 can read by an RFID tag attached to device 116 that permits a relative position of the devices 114, 116 to be determined. In another example, device 114 can include a GPS transceiver, which determines an absolute position of device 114 that can be compared against a position of device 116.

It should be appreciated that the messages 115, 144, 178 delivered to the calling device 112 can be sent from a voicemail system (not shown) remotely located from the mobile device 114. The voicemail system can further store a set of pre-recorded messages that are situationally conveyed to the calling device 112. The called device 114 can convey messages to the voicemail system that indicate which, if any, computing devices 116 are proximate to the called device 114. These messages can permit the voicemail server to determine suitable messages 115, 144, 178 to present to the calling device 112.

To illustrate, a user of device 114 can prerecord a general voicemail message in a wireless service provider's voicemail system to indicate that he/she is away. The user can also record a specific voicemail greeting to indicate that he/she is at an office and can leave an office phone number as an alternative option to leaving a voicemail message. The mobile phone 114 can have an awareness of the different voicemail messages that are recorded on the external voicemail server and can associate different message ID's with each. At this point, the user can preset the "office voicemail greeting" to be sent when the mobile phone 114 detects a presence of an office transmitter (device 116) that is local to the user's work location.

On a particular day, a user can be in the office with the mobile phone 114, which permits the mobile phone 114 to detect that device 116 is proximate to the phone 114. The device 114 can be called by device 112, but the user can fail to answer it in time for any reason. Perhaps the user does not hear the phone 114 ring, the ringer of phone 114 can be turned off, the user cannot get to the phone 114 in time, etc. Regardless of the underlying reason, the incoming call from device 112 can be missed. The mobile phone 114 in cooperation with the voicemail system can then begin a process of determining which voicemail message the caller should receive. Towards this end, the phone 114 can detect the presence of the office transmitter (device 116), can match this transmitter to the users preset option to send the "office voicemail greeting" when the device 116 is detected, and can send an id for the voicemail greeting to the voicemail system hosted by the service provider. The voicemail system can select a voicemail message to be sent 115, 144, 178 based on input from the mobile phone 114 and can send this selected message to calling device 112.

In a different implementation based upon the same sample scenario as above, the device 114 can asynchronously convey "proximity" information to the voicemail server, which stores this information in a table which is constantly updated as the device 114 is moved, which causes proximity 117, 146 information to change. The voicemail server can then use the last known proximity information, which is stored local to the voicemail server, to determine which message to send device 112. This implementation does not require messages to be conveyed from device 114 to the voicemail server at a time the attempt 113, 142, 172 was made, which can be advantageous when the device 114 is powered off or is outside a coverage region and is unable to connect to the voicemail server at a time of the attempt 113, 142, 172. A set of inferential rules can be established within the voicemail server to determine whether stored proximity information for the device 114 is likely to be accurate. For example, after a designated time-out threshold, the proximity information can expire, which causes the voicemail server to use a default message instead of one specific to the proximity information for the device 114.

It should also be appreciated, that the messages 115, 144, 178 conveyed to the calling device 112 can include a set of variable options that can be taken by a device 112 user. These variable options can change depending upon specifics of the message 115, 144, 178, which can depend on a proximity of device 114 to one or more other devices 116.

A sample scenario illustrating variable options included in messages 115, 144, 178 follows. In the scenario, a user can predefine a custom prompt for a voicemail system of device 114, where the custom prompt is to be played when the user is at work. The custom prompt can be associated with a wireless or BLUETOOTH transmitting device (116) located in the office. The custom prompt can include three options that include: an option to leave a message, an option to be forwarded directly to the user's office phone, and an option to be forwarded to a phone of the user's secretary. Each option can correspond to a key press to be input by a calling party.

One day, the user can be at work with the phone 114, but can be engaged in a meeting and can have a ringing option of the phone 114 disabled. At this time, the user's wife can call to inform the user that their son is in the hospital for an emergency surgery. Since the ringing for phone 114 is disabled, the call can be missed. The phone 114 can determine that it is proximate to device 116 (i.e., is in an office) based on wireless signals (WiFi, BLUETOOTH, etc.) transmitted between device 114 and device 116. The phone 114 can therefore, request that a voicemail server send the caller a custom message associated with the office location. The wife, receiving the custom message, can be presented with three options: to leave a message, to be forwarded to the user's phone, and/or to be forwarded to the secretary's phone. The wife can opt to be forwarded to the secretary, who is able to interrupt the user during the meeting to relay the important message concerning the user's son.

Figure 2:
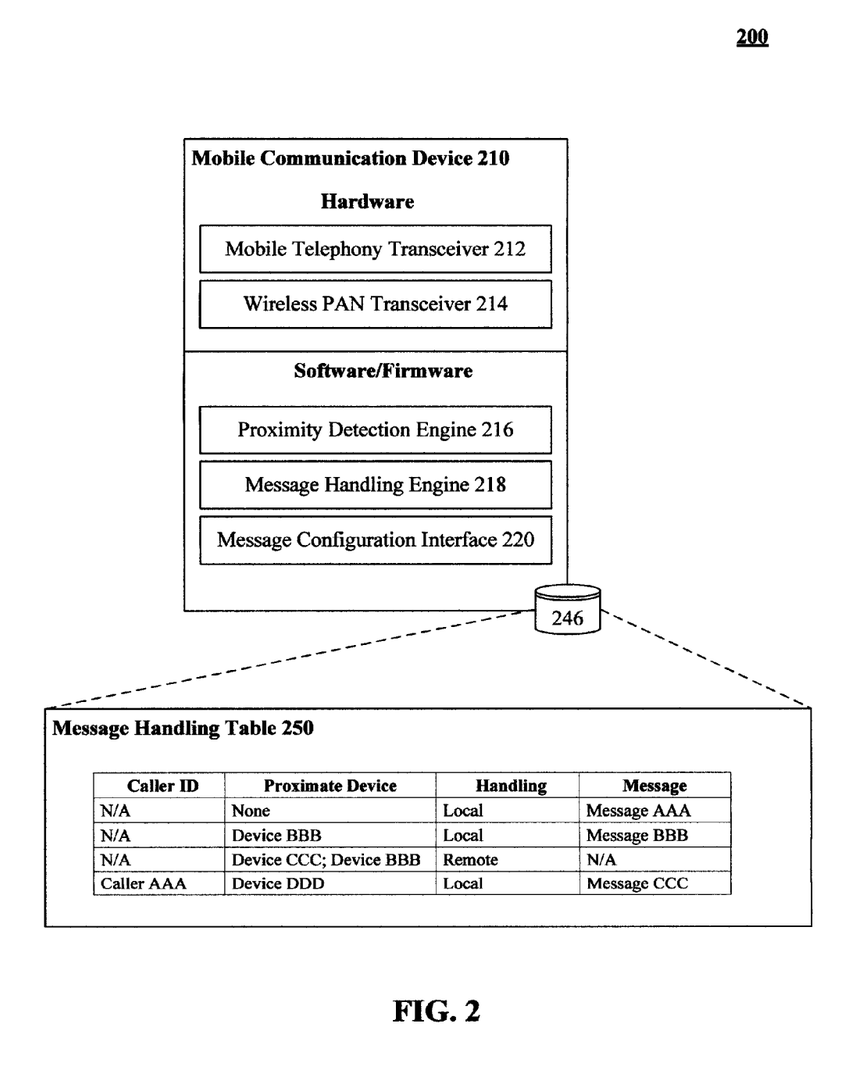
FIG. 2 is a schematic drawing of a mobile communication device for using proximity information to dynamically change greeting messages on a mobile telephony device in accordance with an embodiment of the inventive arrangements disclosed herein.

FIG. 2 is a schematic drawing of a mobile communication device 210 for using proximity information to dynamically change greeting messages on a mobile telephony device in accordance with an embodiment of the inventive arrangements disclosed herein. Mobile device 210 can be one possible embodiment of the device 114 illustrated in situations 110, 140, and 170.

As shown, mobile communication device 210 can include the hardware mobile telephony transceiver 212 and wireless personal area network (PAN) transceiver 214. Mobile communication device 210 can include the software/firmware proximity detection engine 216, message handling engine 218, and message configuration interface 200. Mobile communication device 210 can also include data store 246.

Data store 246 can store message handling table 250, which is used by message handling engine 218. Message handling table 250 can be used to dynamically select greeting messages depending on the proximate devices and whether it's a locally or remotely handled detection in accordance with settings of message handling table 250. These settings can be user configured using message configuration interface 220. The table 250 can establish a selectable set of message handling conditions to be used by message handling engine 218, which are dependent upon a proximity of device 210 to other devices, as determined by proximity detection engine 216. The message handling engine 218 can optionally interact with a voicemail server (not shown) to indicate to the server, which of a set of voicemail messages stored on the voicemail server is to be used in a particular situation. Portions or all of the logic of the message handling engine 218 can be implemented within the voicemail server directly in one contemplated derivate of the disclosed invention. The conditions, rules, and factors recorded in table 250 can be of an arbitrary complexity level so long as deterministic conditions are established which can be executed by device 210. For instance, different messages can be presented to different callers, different combinations of proximate device can result in different greeting messages, different greeting messages can be provided at different times of days for a common set of proximate devices, and the like.

As shown in message handling table 250, a Message AAA is to be used when no devices are present and when any caller is calling. A Message BBB is to be provided when a Device BBB is in proximity to device 210. Message handling table 250 indicates that a remotely processed message can be used when a Device CCC and a Device BBB are in proximity to device 210. When Caller AAA is calling, and when device 210 is proximate to Device DDD, a greeting Message CCC can be conveyed to the Caller AAA.

As shown in system 200, the mobile communication device 210 can be any mobile device able to receive a communication attempts, which when the attempts are not answered delivers a greeting message to a calling device. The greeting message can vary based upon a proximity of device 210 to other devices. The greeting message can be an initial message presented to a caller that informs the caller that a voice message can be left for the callee. The mobile communication device 210 can be a mobile telephone, a two way radio, a Session Initiation Protocol (SIP) based phone, a mobile computer including soft phone software, and the like.

Mobile telephony transceiver 212 can be a computing component that permits wireless data exchanges between a communication network and the device 210. The transceiver 212 can, for example, connect the mobile communication device 210 to a mobile phone network or to a WiFi (802.11 family of protocols) network that is in turn connected to a public telephone network.

The wireless PAN transceiver 214 can be any transceiver able to connect the device 210 to a personal area network (PAN). The PAN can connect the device 210 to nearby devices for information exchange purposes. Further, the PAN transceiver 214 coupled to proximity detection engine 216 can determine an identity of nearby devices, which can be used by the message handling engine 218 to determine which of many different greeting messages are to be conveyed to callers. The PAN transceiver 214 can be a BLUETOOTH transceiver, a wireless USB transceiver, a ZIGBEE transceiver, a WIBREE transceiver, an RF transceiver, a WirelessHD transceiver, and the like.

Proximity detection engine 216 can be any software engine able to detect devices proximate to the device 210. Proximity can be based upon PAN transceiver 214 input, upon a location beacon (not shown) input, and the like. The message handling engine 218 can be a software engine that produces different greeting messages based upon which devices are proximate to device 210. A message configuration interface 220 can be used by a user to configure greeting messages that are to be played to callers. Interface 220 can permit a user to modify values of table 250, which are used by engine 218. Interface 220 can be a graphical user interface, a voice user interface, a multimodal interface, etc.

The data store 246 can be physically implemented within any type of hardware including, but not limited to, a magnetic disk, an optical disk, a semiconductor memory, a digitally encoded plastic memory, a holographic memory, or any other recording medium. Data store 246 can be a stand-alone storage unit as well as a storage unit formed from a plurality of physical devices which may be remotely located from one another. Additionally, information can be stored within the data store 246 in a variety of manners. For example, information, such as table 250 information, can be stored within a database structure or can be stored within one or more files of a file storage system where each file may or may not be indexed for information searching purposes. Information stored in data store 246 can also be optionally encrypted for added security.

Figure 3:
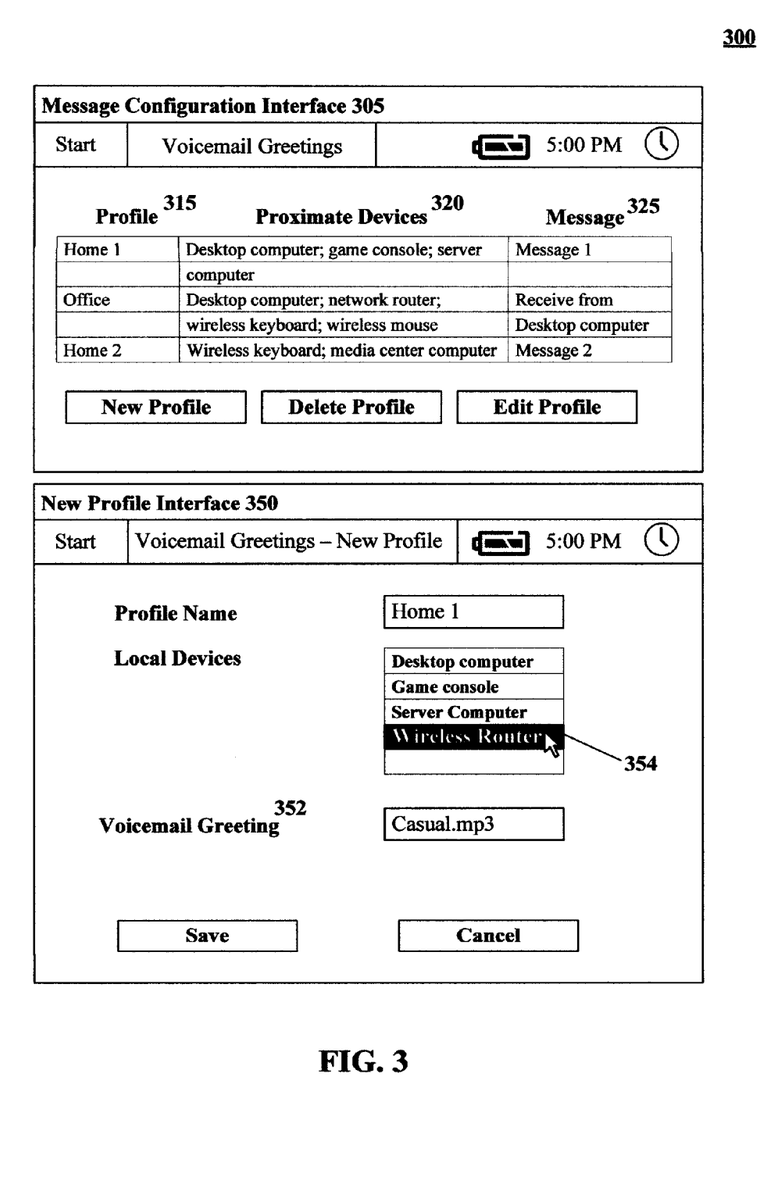
FIG. 3 is a schematic drawing of a message configuration interface for modifying settings relating to presenting greeting messages that vary depending upon which devices are proximate to a called device.

FIG. 3 is a schematic drawing of a message configuration interface 305, 350 for modifying settings relating to presenting greeting messages that vary depending upon which devices are proximate to a called device. In interface 305, one or more profiles 315 can be established that associate a set of one or more proximate 320 devices to configurable greeting messages 325. As shown, three profiles 315 are defined, two for different home environments (Home 1 and Home 2) and one for an office environment. The interface 305 assumes that different environments for which a customized greeting message 325 is associated include a characteristic set of detectable devices. For example, a home environment can include a desktop computer, a game console, and a home server. When proximate to any of these devices 320, a greeting Message 1 can be active. When a mobile device is proximate to any office device, a greeting message from an office desktop computer can be used. When proximate to devices listed in the Home 2 profile, a Message 2 can be presented. Options can be provided to record new messages, to edit profiles 315, to delete a profile 320, and the like.

The interface 350 illustrates a different interface for creating a new profile, such as Home 1. In interface 350, a set of local devices 354 linked to the named profile can be established. These devices 354 can be those, which are detectable by a mobile telephone, which plays greeting messages to callers. Greeting messages 352 can be specified in the profile 350 creation interface.

It should be emphasized that the interfaces 305, 350 are presented to illustrate a potential means for configuring greeting options of a mobile communication device. The invention is not to be limited to details expressed in sample interfaces 305 or 350. That is, other configuration options, arrangements, and interface elements can be used, yet still be considered within scope of the present invention. For example, each profile 315 of interface 305 can include user adjustable conditional statements. Evaluation results from these conditional statements can be linked to different messages 325 that are selectively played to callers.

Figure 4:
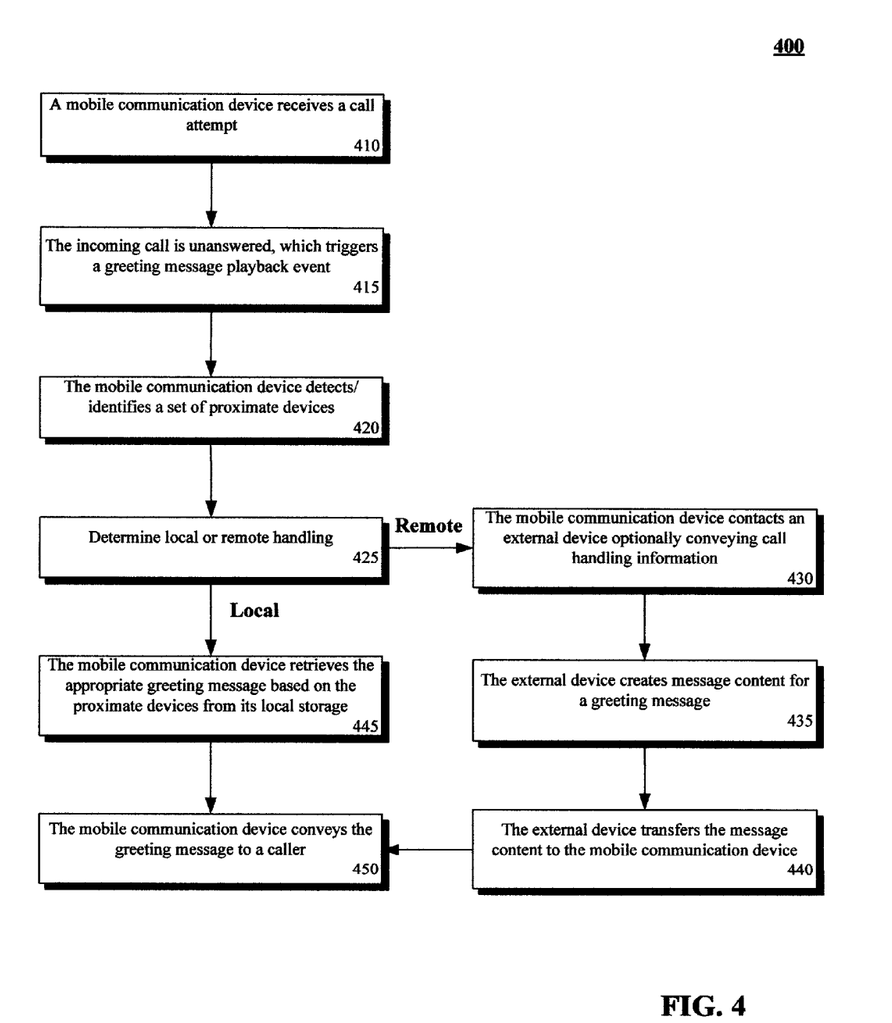
FIG. 4 is a flow chart of a method for using proximity information to dynamically change settings on a mobile telephony device in accordance with an embodiment of the inventive arrangements disclosed herein.

FIG. 4 is a flow chart of a method 400 for using proximity information to dynamically change settings on a mobile telephony device in accordance with an embodiment of the inventive arrangements disclosed herein. Method 400 can be performed in a context of a mobile communication device 210.

The method 400 can begin in step 410, where a mobile communication device can receive a call attempt. In step 415, the call can be unanswered. Greeting messages are commonly delivered to the caller when the call is unanswered, which is the case for method 400. In step 420, the mobile telephony device can detect a set of proximate devices. In one embodiment, the mobile telephony device can interface with an external device to receive proximity information. In another embodiment, the detection of proximate devices can repetitively occur, which is can be used to populate an automatically updated data store, which is used by a message handling engine of the mobile device for purposes of greeting message customization. In step 425, the mobile telephony device can determine whether to handle the dynamic selection of the greeting message locally or remotely.

If in step 425, the dynamic selection will be handled remotely, method 400 can continue to step 430, where the mobile communication device can contact an external device optionally notifying it of the proximate devices and call details, which can be used during remote processing operations. In step 435, the external device can determine and create content for a greeting message. In step 440, the external device can transfer the message content to the mobile communication device. In step 450, the mobile communication device can convey the greeting message including remotely processed content to a caller.

If in step 425, the greeting message is determined to be handled locally, method 400 can continue to step 445, where the mobile communication device can retrieve from a local storage area, an appropriate message based upon which devices are currently proximate to the mobile device. In step 450, the mobile communication device can convey the selected greeting message to a caller. In one implementation, instead of executing step 450, the mobile communication device can convey an indicator for an appropriate message to a voicemail server. The voicemail server can convey the associated voicemail message to the caller.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. A method for delivering customized greeting messages to callers comprising:

receiving, at a mobile communication device, a call from a remote device;

determining, via a message handling engine stored in a storage medium of the mobile communication device and executing on hardware of the mobile communication device, a greeting message is to be conveyed to the remote device due to a failure of a receiving party to answer the call;

identifying, responsive to the receiving of the call, at the mobile communication device, a set of devices proximate to the call receiving device, utilizing a proximity detection engine stored in a storage medium of the mobile communication device and executing on hardware of the mobile communication device;

connecting to one of the proximate devices over a wireless personal area network (PAN);

receiving a greeting message content generated by the connected proximate device;

determining, at the mobile communication device using the message handling engine of the mobile communication device, one of many different greeting messages based upon the identified set of proximate devices, wherein each of the many different greeting messages are stored in a storage medium of the mobile communication device, wherein the determined greeting message comprises the greeting message content; and conveying the determined greeting message from the mobile communication device to the remote device.

2. The method of claim 1, wherein the greeting message is an introductory message played before enabling a caller to leave a message.

3. The method of claim 1, wherein the greeting message is an audio message.

4. The method of claim 3, wherein each of the many different greeting messages are voice messages established by a user of the call receiving device.

5. The method of claim 4, further comprising:
identifying a plurality of user established profiles, each profile relating one of the different greeting messages to a set of devices, wherein the determining step utilizes the user established profiles.

6. The method of claim 1, wherein the identifying step is performed by detecting a set of devices within a wireless personal area network (PAN) range of the call receiving device, which comprises a PAN transceiver.

7. The method of claim 1, wherein said steps of claim 1 are steps performed automatically by at least one machine in accordance with at least one computer program having a plurality of code sections that are executable by the at least one machine, said at least one computer program being stored in a machine readable medium.

8. A mobile communication device comprising:
a message handling engine stored in a storage medium of the mobile communication device configured to provide different greeting messages to callers selected based upon devices proximate to the mobile communication device;
a proximity detection engine stored in the storage medium of the mobile communication device configured to detect devices proximate to the mobile communication device;
a storage medium for storing the different greeting messages that are provided to callers by the message handling engine;
a mobile telephony transceiver;
a wireless PAN transceiver;
a mobile telephony transceiver configured to connect the mobile communication device to a mobile communication network over which the callers communicate with the mobile communication device; and
a wireless personal area network (PAN) transceiver configured to establish a personal area network over which data is able to be exchanged with proximate devices, wherein the personal area network (PAN) transceiver is used to detect which devices are proximate to the mobile communication device for purposes of determining which greeting message to provide.

9. The mobile communication device of claim 8, wherein each of the greeting messages are messages to be conveyed to remote device whenever incoming calls are not answered.

10. The mobile communication device of claim 9, wherein the mobile communication device comprises a configurable setting for establishing either local or remote message handling, wherein different sets of callers and proximate devices are indexed against different message handling settings.

11. The mobile communication device of claim 8, further comprising:
a message handling interface through which profiles are able to be established, wherein different profiles are determined by the mobile communication device based on which devices are detected proximate to the mobile communication device at a time a call is received by the mobile communication device.

12. The mobile communication device of claim 8, wherein at least one of the devices proximate to the mobile communication device that the proximity detection engine is configured to detect comprises a wireless keyboard and a wireless mouse.

13. The mobile communication device of claim 2, further comprising:
a data store configured to store the different greeting messages, which are each user established messages, wherein the data store also comprises a set of indexed records that associates proximate devices to the different greeting messages, wherein the message handling engine decides which greeting message to provide to callers using the set of indexed records.

14. The mobile communication device of claim 13, further comprising:
a message configuration interface configured to permit a user of the mobile communication device to change values of the set of indexed records.

15. A non-transitory computer readable storage medium comprising software for causing a mobile communication device to deliver different greeting messages depending on devices proximate to the mobile communication device that has received a call, said software comprising:
a set of programmatic instructions executing on hardware of a mobile communication device, said set of programmatic instructions configured to direct the mobile communication device to provide different greeting messages to callers based upon which devices are proximate to the mobile communication device at a time of receiving a call for which the different greeting is to be provided, wherein each of the greeting messages are messages to be conveyed to remote device from the mobile communication device whenever incoming calls are not answered, wherein the set of programmatic instructions are able to be stored in a data store accessible by the mobile communication device, and wherein the set of programmatic instructions are executable by the mobile communication device; and
a set of programmatic instructions stored in the computer readable storage medium that when executed by the mobile communication device produces a message handling interface through which profiles are able to be established, wherein different profiles are determined by the mobile communication device based on which devices are detected proximate to the mobile communication device at a time a call is received by the mobile communication device.

16. The non-transitory computer readable storage medium of claim 15, further comprising:

a set of programmatic instructions stored in the computer readable storage medium configured to determine which devices are proximate to the mobile communication device based upon information received by the mobile communication device via a wireless personal area network (PAN) transceiver.

17. The non-transitory computer readable storage medium of claim 15, wherein the greeting message is an introductory message played before enabling a caller to leave a message.

* * * * *